United States Patent
Hu (10) Patent No.: US 8,305,428 B2
(45) Date of Patent: Nov. 6, 2012

(54) STEREO VIDEO SHOOTING AND VIEWING DEVICE

(75) Inventor: Chao Hu, Guangzhou (CN)

(73) Assignee: Inlife-Handnet Co., Ltd, Shenzhen (CN)

( * ) Notice: Subject to any disclaimer, the term of this patent is extended or adjusted under 35 U.S.C. 154(b) by 1012 days.

(21) Appl. No.: 12/123,774

(22) Filed: May 20, 2008

(65) Prior Publication Data

US 2008/0284842 A1   Nov. 20, 2008

Related U.S. Application Data

(63) Continuation of application No. PCT/CN2007/002737, filed on Sep. 17, 2007.

(30) Foreign Application Priority Data

| Apr. 18, 2007 | (CN) | 2007 2 0147347 U |
| Jun. 13, 2007 | (CN) | 2007 2 0052716 U |
| Mar. 11, 2008 | (CN) | 2008 2 0044739 U |
| Mar. 14, 2008 | (CN) | 2008 2 0044946 U |

(51) Int. Cl.
   *H04N 13/02* (2006.01)
(52) U.S. Cl. ............... 348/46; 348/42; 348/48
(58) Field of Classification Search ............ 348/42, 348/48
   See application file for complete search history.

(56) References Cited

U.S. PATENT DOCUMENTS

2006/0164509 A1* 7/2006 Marshall et al. ............ 348/42

OTHER PUBLICATIONS

International Search Report for PCT/CN2007/002737, dated Dec. 14, 2007.
Hu Chao, CN2877174 Y, Mar. 7, 2007, p. 2, lines 26-31 and p. 3, figures 1-3.
Hu Chao, CN2911724 Y, Jun. 13, 2007, p. 2, figure 1.
Hu Chao, CN 2834064 Y, Nov. 1, 2006, whole document.
Sony Electronics Inc., CN 194874 A, Mar. 21, 2007, whole document.
Ricoh Co. Ltd., JP 7095620 A, Apr. 7, 1995, whole document.

* cited by examiner

*Primary Examiner* — Yves Dalencourt
(74) *Attorney, Agent, or Firm* — Pearne & Gordon LLP (57) ABSTRACT

A stereo video shooting and viewing device includes: a body, having two groups of eyepieces spaced apart from each other by a certain distance corresponding to a distance between two human eyes; two micro display screens, disposed on front ends of the eyepieces; two digital camera lenses, disposed on an outer side of the body, spaced apart from each other by a certain distance corresponding to the distance between two human eyes, and used for synchronously capturing images with a visual angle difference corresponding to that of the human eyes; and a main control unit (MCU), connected to the two micro display screens and the two digital camera lenses, and used for processing the images synchronously captured by the two digital camera lenses and image signals received from exterior, and displaying the images on the two micro display screens separately. In this embodiment, the images with the visual angle difference corresponding to that of the human eyes captured by the camera lenses are separately displayed on the micro display screens, so as to form a stereo image once being viewed by human eyes, thereby having the advantages of simple structure and vivid stereoscopic effects.

27 Claims, 7 Drawing Sheets

STEREO VIDEO SHOOTING AND VIEWING DEVICE

CROSS-REFERENCE TO RELATED APPLICATIONS

The present application is a Continuation-In-Part of International Patent Application No. PCT/CN2007/002737 filed Sep. 17, 2007, and claims priority to Chinese Patent Application No. 200720147347.4 filed Apr. 8, 2007, both of which are incorporated herein by reference in their entirety. The present application also claims priority to Chinese Patent Application Nos. 200720052716.1 filed Jun. 13, 2007; 200820044739.2 filed Mar. 11, 2008; and 200820044946.8 filed Mar. 14, 2008; all of which are incorporated herein by reference in their entirety.

FIELD OF THE INVENTION

The present invention relates to a video shooting and displaying device, and more particularly to a stereo video shooting and displaying device.

BACKGROUND OF THE INVENTION

When people observe an object with eyes, a stereoscopic picture is made in his/her mind. As the distance between pupils of human eyes is approximately 6-7 cm, when the people observe the same object, the view angles for the two eyes are not wholly the same. Although there is merely a slight difference between the two eyes, after the slight difference is transferred to the human's brain through retinas, a far and near sense is generated in the brain, so as to produce a stereoscopic picture. Although the object can also be viewed merely with one eye, it is difficult to tell the far and near sense or the distance from the object. According to this principle, as for the same picture, if two images with a slight angle difference are produced or shot by utilizing a visual angle difference of the eyes, and then the two images are respectively viewed by the eyes, a stereo picture is generated in the brain through the retinas. Currently, the principle has been widely applied to various stereo image demonstration techniques. However, most of the existing stereo image viewing devices have the defects of complicated technique, high cost, and poor viewing effect, so it is difficult for such devices to be popularized. With the development of the electronic science, a multi-functional electronic product, integrated with various functions including communication, camera, FM radio and video recording, displaying, and game playing, has been proposed, which has revolutionary meaning as compared with the conventional electronic products. However, most of the electronic products involving video can only display planer images, and seldom personal electronic product can enable people to directly view high-quality stereo images with the eyes.

SUMMARY OF THE INVENTION

In order to overcome the defects, the technical problem to be solved by the present invention is to provide a stereo video shooting and viewing device.

The technical problem of the present invention is solved through the following technical solutions.

The present invention provides a stereo video shooting and viewing device, which includes a body, two micro display screens, two digital camera lenses, and a main control unit (MCU).

The body has two groups of eyepieces disposed therein, and the two groups of eyepieces are spaced apart from each other by a certain distance corresponding to a distance between two human eyes.

The two micro display screens are disposed on front ends of the two groups of eyepieces respectively.

The two digital camera lenses are disposed on an outer side of the body, and spaced apart from each other by a certain distance corresponding to the distance between two human eyes, and the two digital camera lenses synchronously capture images with a visual angle difference corresponding to that of the human eyes.

The MCU is connected to the two micro display screens and the two digital camera lenses, for processing the images synchronously captured by the two digital camera lenses, and displaying the images on the two micro display screens separately.

In another embodiment, the stereo video shooting and viewing device further includes a naked-eye stereoscopic liquid crystal display (LCD) screen.

As compared with the conventional art, the present invention has the following beneficial effects.

With the above structure of the present invention, the two digital camera lenses synchronously capture images with the visual angle difference corresponding to that of the human eyes, and then, after being processed by the MCU, the images are respectively displayed on the two display screens separately. When people view the two synchronous images displayed on the two display screens with two naked eyes respectively, and the two synchronous images have the viewing angle difference corresponding to that of the human eyes, a stereo image with the far and near sense is produced in the brain after the visual signals have been transferred to the brain. In the present invention, the image data may be input and output through wireless transmission, and the image data is displayed on a third party tool with a stereo image display function, for example, a glass-type stereo video player. The present invention does not require any complicated image processing technique or expensive display panel, but has a simple structure, low cost, vivid stereo effect of the displayed images. Furthermore, the present invention achieves the stereoscopic effects through a simple and convenient way, in which it is also possible to watch the video while shooting, to download image signals from the exterior and to play the image signals, and to enable the player to be deeply involved in playing stereo electronic games, thereby providing a new multi-functional personal electronic product to consumers.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Embodiment 1

Figure 1:
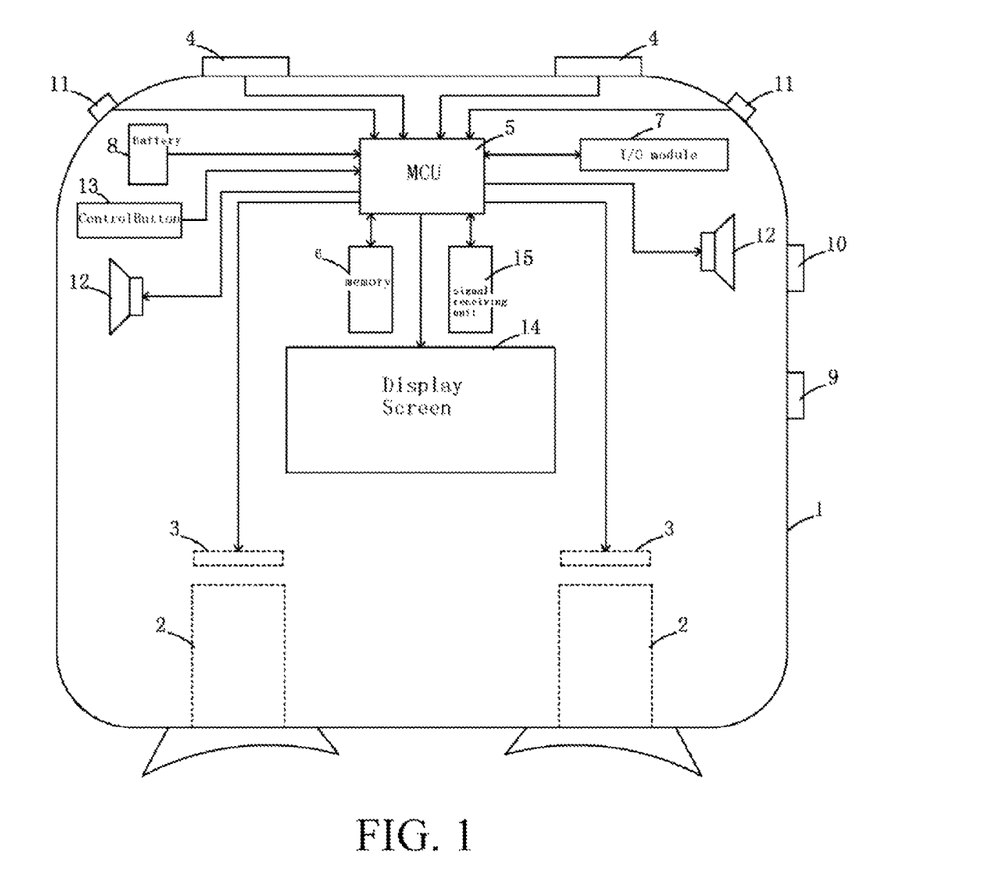
FIG. 1 is a schematic structural view of Embodiment 1 of the present invention.
Figure 2:
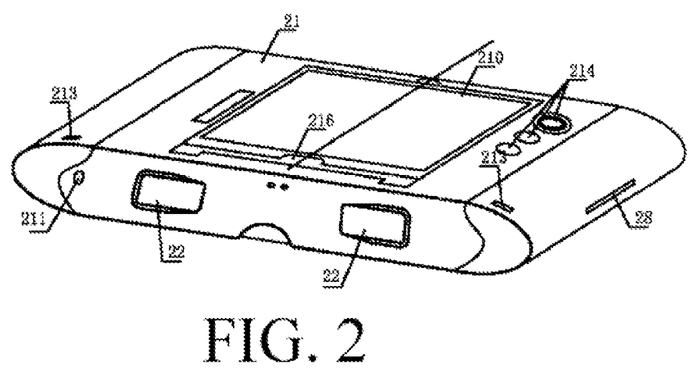
FIG. 2 is a three-dimensional structural view of Embodiment 2 of the present invention.
Figure 3:
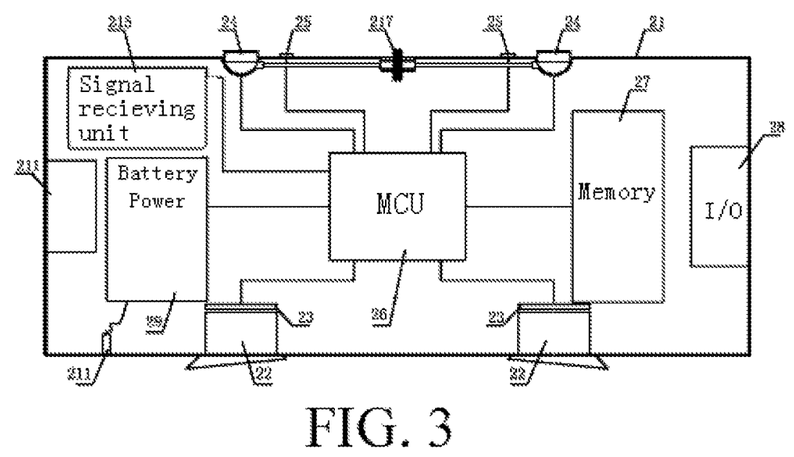
FIG. 3 is a schematic structural view of Embodiment 2 of the present invention.
Figure 4:
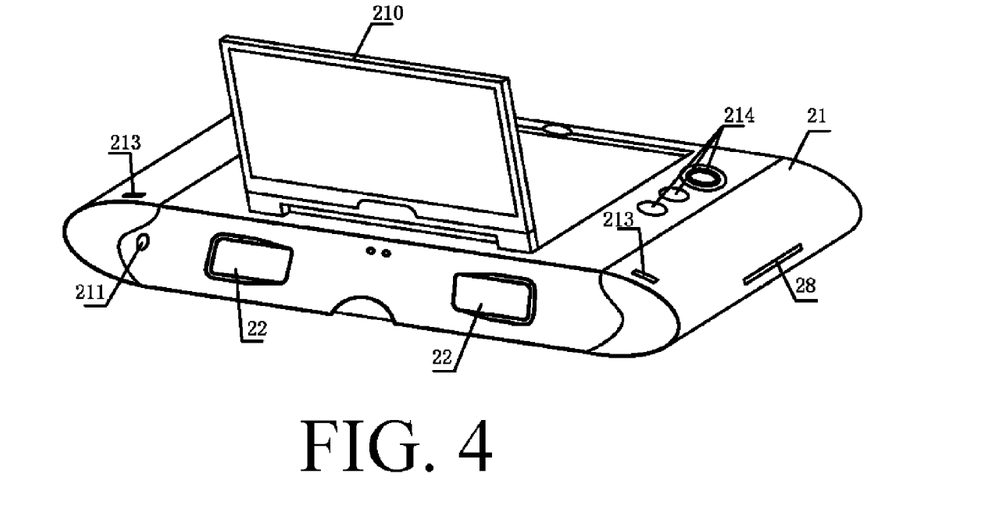
FIG. 4 is a three-dimensional structural view of a naked-eye stereoscopic LCD screen after being turned outwards according to Embodiment 2 of the present invention.
Figure 5:
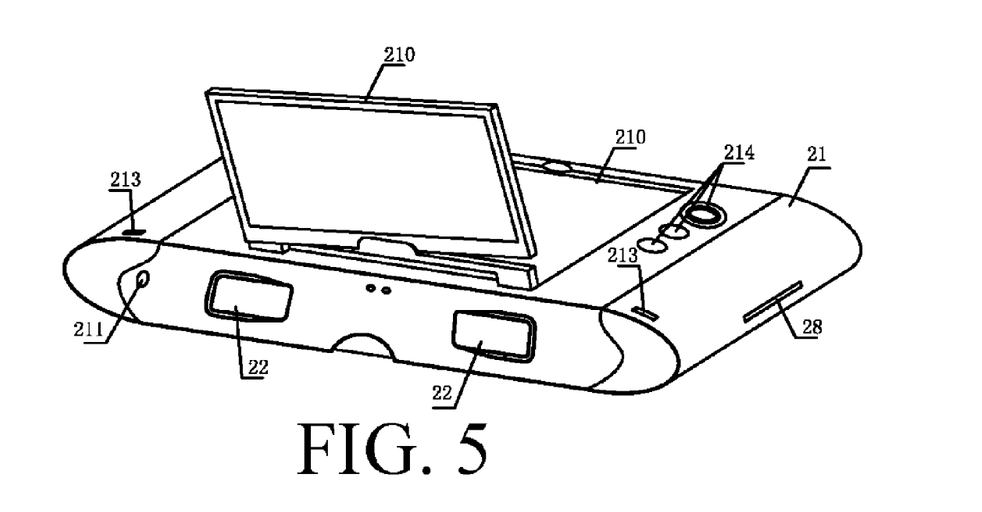
FIG. 5 is a three-dimensional structural view of the naked-eye stereoscopic LCD screen being rotated for a certain angle after being turned outwards according to Embodiment 2 of the present invention.

Referring to FIG. 1, a stereo video shooting and viewing device includes a body 1, two groups of eyepieces 2, two micro display screens 3, two digital camera lenses 4, a main control unit (MCU) 5, a memory 6, an input/output module (I/O module) 7, a battery power 8, an external power port 9, a memory card slot 10, two pick-ups 11, two speakers 12, a control button 13, and a display screen 14.

The body 1 has two groups of eyepieces 2 disposed therein, and the eyepieces 2 are lens assemblies having a zoom-in effect and capable of prolonging a virtual imaging distance. The two groups of eyepieces 2 are spaced apart from each other by a certain distance corresponding to a distance between two human eyes. The two micro display screens 3 are respectively disposed on front ends of the two groups of eyepieces 2. When people view the synchronous images displayed on the two micro display screens 3 through the two groups of eyepieces 2 with two naked eyes respectively, and the synchronous images have a visual angle difference corresponding to that of human eyes, a stereo image of scenery is produced in his/her mind. The two digital camera lenses 4 are disposed on an outer side of the body 1, and spaced apart from each other by a certain distance corresponding to the distance between two human eyes. The two digital camera lenses 4 are used to shoot the same scenery as that viewed by the human eyes, and synchronously capture images with a visual angle difference corresponding to that of the human eyes. The MCU 5 is connected to the two micro display screens 3 and the two digital camera lenses 4, processes the images synchronously captured by the two digital camera lenses 4, and separately displays the images on the two micro display screens 3. The memory 6 is connected to the MCU 5, stores an image data generated upon being processed by the MCU 5, and further has a memory card slot 10 for expansion. The I/O module 7 is connected to the MCU 5 for exchanging data with the exterior, for example, receiving signals from the exterior or outputting signals to the exterior. The I/O module 7 may include a wireless transmission module, for example, a Bluetooth module, a wireless fidelity (WIFI) module, and an infrared transmission module; and the input/output module 7 may also include a wired transmission module, for example, a universal serial bus (USB) port, and a conventional audio/video analogue or digital input and output interface. The battery power 8 supplies a power to the micro display screens 3, the digital camera lenses 4, the MCU 5, the memory 6, and the I/O module 7. The body 1 further has an external power port 9, two pick-ups 11, and two speakers 12. The external power port 9 is connected to the battery power 8. The two pick-ups 11 and the two speakers 12 are connected to the MCU 5, in which the pick-ups 11 are used to record audio signals, and the speakers 12 are used to play the audio signals. The body 1 further has a stereoscopic mobile television (TV) signal receiving unit 15 for synchronously receiving the audio signals and two groups of video signals. The signal receiving unit 15 may be a mobile TV receiving unit following the DMB-TH broadcast standard, and the signal receiving unit 15 is electrically connected to the MCU 5. The MCU 5 processes the audio signals and transfers the processed audio signals to the speakers 12, and processes the two groups of video signals and separately displays the processed video signals on the two micro display screens 3, such that it is convenient for the users to receive and store the stereoscopic TV broadcasting signals at any time.

The body 1 has the control button 13 disposed thereon, for controlling to play signals and to shoot stereo images. The body 1 further has the display screen 14 connected to the MCU 5 for view-finding during shooting.

In practical applications, the stereo video shooting and viewing device of this embodiment may not only be used as a stereo image player, a stereoscopic TV broadcasting receiver, a stereo image shooting and storing device, and a stereo image shooting monitor, but also be used as a stereo game machine, an Internet stereo image display, a music player, and a sound recorder. In this embodiment, the image data may be input and output through wireless transmission, such that the image data is displayed on a third party tool with the stereo image displaying function, for example, a glass-type stereo video player, thereby providing a novel portable personal entertainment and business electronic product to the consumers.

Embodiment 2

Referring to FIGS. 2 to 5, the stereo video shooting and viewing device in this embodiment includes a body 21, having two groups of eyepieces 22 disposed on one side surface thereof and spaced apart from each other by a certain distance corresponding to a distance between two human eyes; two micro display screens 23, respectively disposed on front ends of the two groups of eyepieces 22 in the body 21; two digital camera lenses 24 and two pick-ups 25, disposed on the other side surface of the body 21, in which the two digital camera lenses 24 are spaced apart from each other by a certain distance corresponding to the distance between two human eyes, and synchronously capture images with a visual angle difference corresponding to that of the human eyes. The body 21 further has a MCU 26 respectively connected to the two micro display screens 23, the two digital camera lenses 24, and the two pick-ups 25. The body 21 further has a memory 27, an input/output module (I/O module) 28, and a battery power 29 connected to the MCU 26. The memory 27 is used to store image data generated upon being processed by the MCU 26. The I/O module 28 may be a Bluetooth module, a WIFI module, or an infrared transmission module, and the I/O module 28 also may be a wired transmission module, for example, a USB port or an audio/video analogue or digital input and output interface, for exchanging data with the exterior. The body 21 has a naked-eye stereoscopic LCD screen 210 disposed thereon and connected to the MCU 26. One side of the naked-eye stereoscopic LCD screen 210 is hinged to the body 21 through a swivel base 216, and the naked-eye stereoscopic LCD screen 210 is movably connected to the swivel base 216. In this way, depending upon specific requirements, the naked-eye stereoscopic LCD screen 210 may be turned outwards with respect to the body 21, or may be further rotated for a certain angle towards the side surface of the body after being turned outwards, such that it is convenient to monitor the graphics during shooting. The body 21 further has an external power port 211, a memory card slot 212, speakers 213, and control buttons 214. The external power port 211 is connected to the battery power 29, and the memory card slot 212, the speakers 213, and the control buttons 214 are connected to the MCU 26. The body 21 further has a stereo signal receiving unit 215 for synchronously receiving audio signals and two groups of video signals, and the stereo signal receiving unit 215 is connected to the MCU 26. The MCU 26 processes the images synchronously captured by the two digital camera lenses 24 and audio signals synchronously captured by the two pick-ups 25, or the audio signals and two groups of video signals received by the stereo signal receiving unit 215, selectively displays the video signals on the two micro display screens 23 separately or simultaneously on the naked-eye stereoscopic LCD screen 210, or displays the video signals only on the naked-eye stereoscopic LCD screen 210 through the control buttons 214, and transfers the audio signals to the speakers 213. In this embodiment, the two digital camera lenses 24 and the body 21 are movably connected together in a manner of being inclined inwards, and an inward-inclined angle thereof is adjusted through an adjusting nut 217, such that it is convenient for view-finding during shooting.

Embodiment 3

Figure 6:
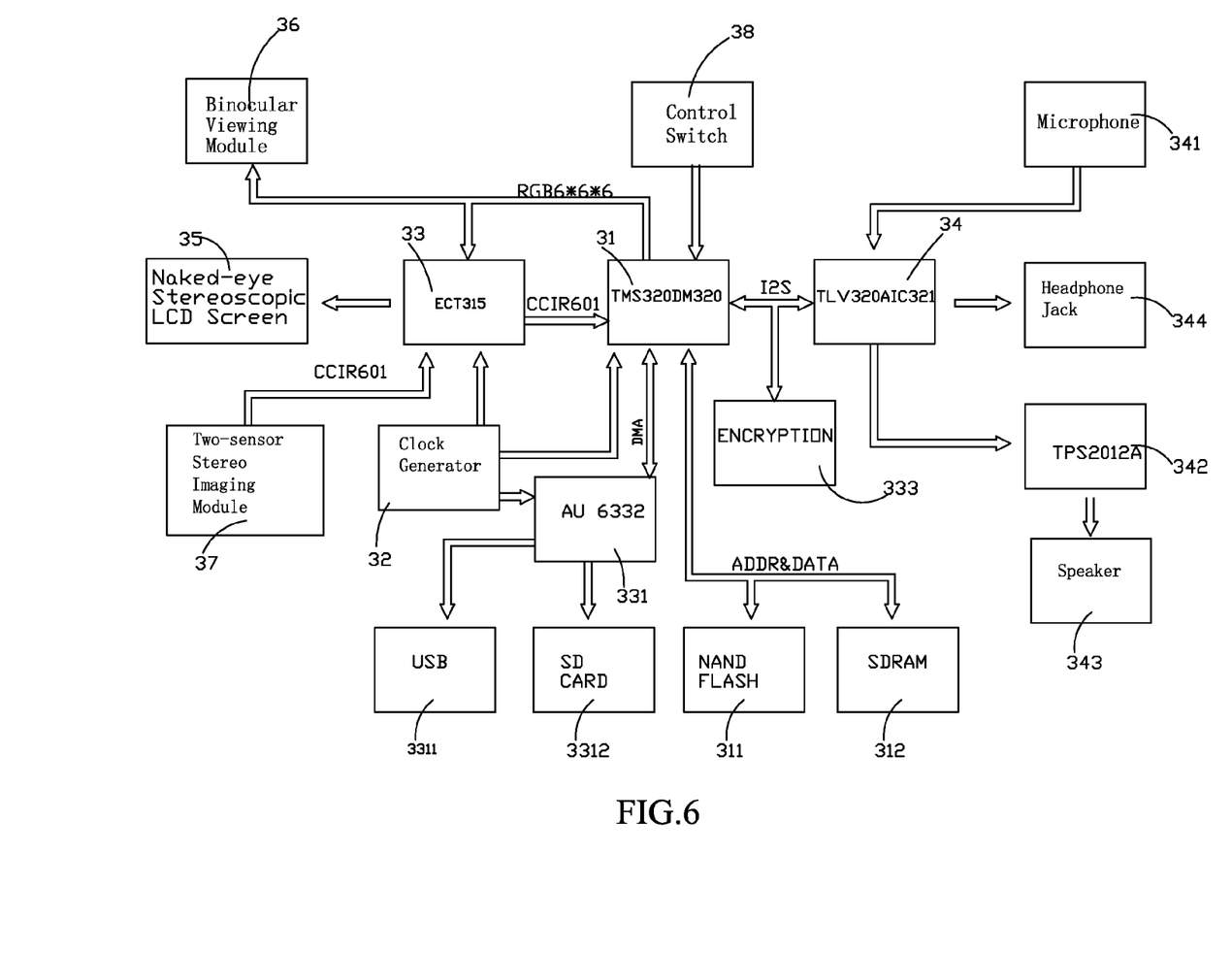
FIG. 6 is a schematic structural view of Embodiment 3 of the present invention.
Figure 7:
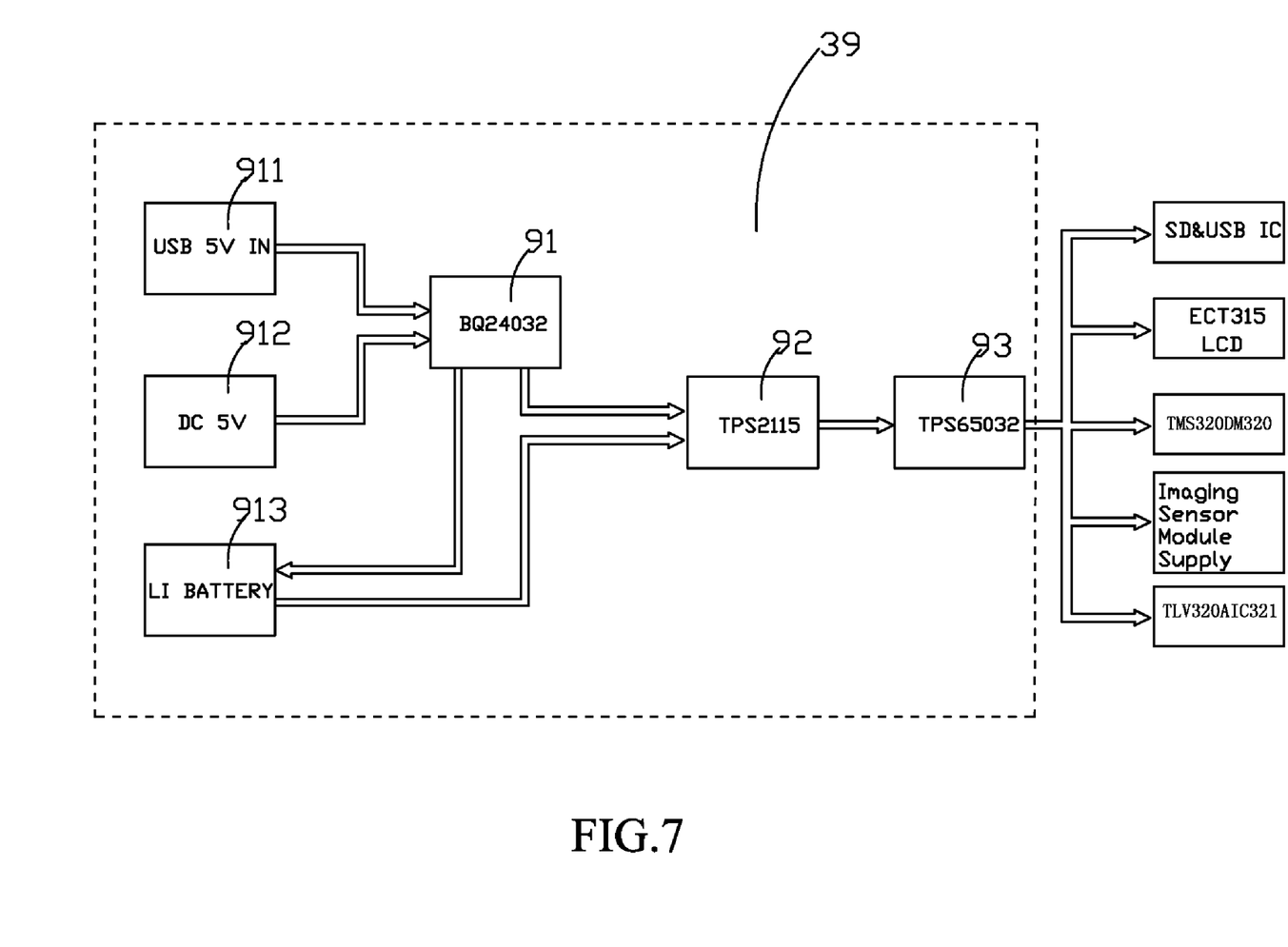
FIG. 7 is a schematic structural view of a power system according to Embodiment 3 of the present invention.

Referring to FIGS. 6 and 7, in order to realize the particular circuit structure with the functions as described in Embodiment 1 and Embodiment 2, the stereo video shooting and viewing device in this embodiment includes a central processing unit (CPU) 31, a clock generator 32, an image processor 33, an audio processor 34, a naked-eye stereoscopic LCD screen 35, a binocular viewing module 36, a two-sensor stereo imaging module 37, a control switch 38, a power system 39, a real time clock 310, a memory 311, a buffer memory 312, an SD &USB drive 331, a USB port 3311, an SD card expansion slot 3312, a microphone 341, an audio amplifier 342, a speaker 343, and a headphone jack 344. The power system 39 further includes a power management and Li battery charging unit 91, a power adjusting unit 92, a power management unit 93, a USB power port 911, an external power port 912, and a Li battery 913.

In this embodiment, the buffer memory 312 may be a synchronous dynamic random access memory (SDRAM). In this embodiment, the binocular viewing module 313 may particularly include two groups of eyepieces 2 and two micro display screens 3, which have the same structures as that in Embodiment 1 or Embodiment 2. The microphone 341 in this embodiment is equivalent to the pick-ups 11 in Embodiment 1 or the pick-ups 25 in Embodiment 2. The MCU in Embodiment 1 and Embodiment 2 is equivalent to functions including the CPU 31, the clock generator 32, the image processor 33, and the audio processor 34 in this embodiment. The model of the CPU 31 in this embodiment is preferably TMS320DM320, and other processing integrated circuits (ICs) with similar functions, for example, TMS320DM280 or TMS320DM355, may be selected. The model of the image processor 33 is preferably ECT 315, and other image processing ICs with similar functions, for example, ECT223, may be selected. The model of the audio processor 34 is preferably TLV320AIC311, and other audio processing ICs with similar functions, for example, CS4265 or AK4524, may be selected. The model of the power management and Li battery charging unit 91 is preferably BQ24032, the model of the power adjusting unit 92 is preferably TPS1115, and the model of the power management unit 93 is preferably TPS65032.

In this embodiment, the image shooting and playing principle is described as follows. The image processor 33 has an image input end being electrically connected to an output end of the two-sensor stereo imaging module 37, receives the two groups of synchronous image signals with the visual angle difference, and transmits the synchronous image signals after being filtered and synthesized to the CPU 31 through a CCIR601 interface. Then, the CPU 31 compresses and stores the received CCIR601 signals according to the storage format. During playing, the data in the memory is firstly decompressed and then output through an image output end of the CPU 31 in an RGB signal format, and the CPU 31 may selectively control the binocular viewing module 36 to receive the data through an input end thereof and to display the image. Under such a display mode, the two groups of image signals with the visual angle difference are respectively displayed on the two micro LCD screens of the binocular viewing module 36, and a stereo image is produced when people view the two groups of display contents respectively with two eyes. Alternatively, the data may be received by the image processor 33 via the image input end thereof, and then output to the naked-eye stereoscopic LCD screen 35, in which the image processor 33 further drives the naked-eye stereoscopic LCD screen 35 to display the images. The crystal clock generator 32 is electrically connected to the CPU 31, the image processor 33, and the SD&USB drive 331 respectively, so as to provide the crystal oscillation of 27 MHz or 48 MHz to the CPU 31, provide the crystal oscillation of 20 MHz to the image processor 33, and provide the crystal oscillation of 12 MHz to the SD&USB drive 331, thereby facilitating the normal operation of the internal programs.

In this embodiment, the audio receiving and processing principles are described as follows. An input end of the audio processor 34 is electrically connected to an output end of the microphone 341, for receiving audio signals. An output end of the audio processor 34 is electrically connected to the headphone jack 344 and an input end of the audio amplifier 342 respectively, for outputting audio signals. The audio processor 34 is electrically connected to the CPU 31 through an I2S interface, for transmitting and storing the data.

In this embodiment, the data storing and transmitting principles are described as follows. The CPU 31 is electrically connected to the internal memory 311, the buffer memory 12, and the SD&USB drive 331 respectively. The internal memory 311 is an NOND flash memory with a nonvolatile technique, which has a maximum capacity of up to 4 G. The buffer memory 12 provides a capacity of 16 MB*2, so as to improve the processing speed of the CPU 31. The CPU 31 receives and processes the image signals and the audio signals and then transfers the processed image signals and audio signals to the internal memory 311 through an ADDR &DATA bus for storage. The SD&USB drive 331 is electrically connected to the USB port 3311 and the SD card expansion slot 3312 respectively, for providing driving. The USB port 3311 is used for data transmission, for example, to receive data from the exterior or to output data to the exterior. The SD card expansion slot 3312 supports the access of the SD card with the maximum capacity of 4G, for expanding the storage capability of the memory, which is convenient for data transmission.

In this embodiment, the operation principles of the power and the control system are described as follows.

The power management and Li battery charging unit 91 is electrically connected to the power adjusting unit 92, the USB power port 911, the external power port 912, and the Li battery 913. The power adjusting unit 92 is electrically connected to the Li battery 913 and the power management unit 93 respectively. The power management and Li battery charging unit 91 manages the power input from the USB power port 911 and the external power port 912, or charges the Li battery by using the externally-input power when the Li battery 913 runs out of power. The power adjusting IC may select an externally-connected direct current (DC) power source or the battery power of the Li battery to provide power to the device. The power management unit 93 is electrically connected to the CPU 31, the SD&USB drive 331, the image processor 33, the audio processor 34, the naked-eye stereoscopic LCD screen 35, the binocular viewing module 36, and the two-sensor stereo imaging module 37 respectively. The power management unit 93 converts and bucks the received power and provides the power to each module, and particularly, the power management unit 93 provides a DC power of 1.6 V to the main control system, provides a power of 1.35V to the two-sensor stereo imaging module 37, provides a power of 1.8V to the audio processor 34, provides a power of 2.8V to the image processor 33, the naked-eye stereoscopic LCD screen 35, and the LCD screens in the binocular viewing module 36, and provides a power of 3.3 V to each interface and the SD&USB drive 331.

The control switch 38 is electrically connected to the CPU 31, for controlling to play signals, shooting stereo images, and selecting the playing devices, etc.

In the technical solution of this embodiment, through being displayed by the binocular viewing module, a vivid stereoscopic imaging effect is achieved, and the resolution of each of the two micro display screens falls between QVGA and VGA, which may approximately reach half of the resolution of the VGA.

Embodiment 4

Figure 8:
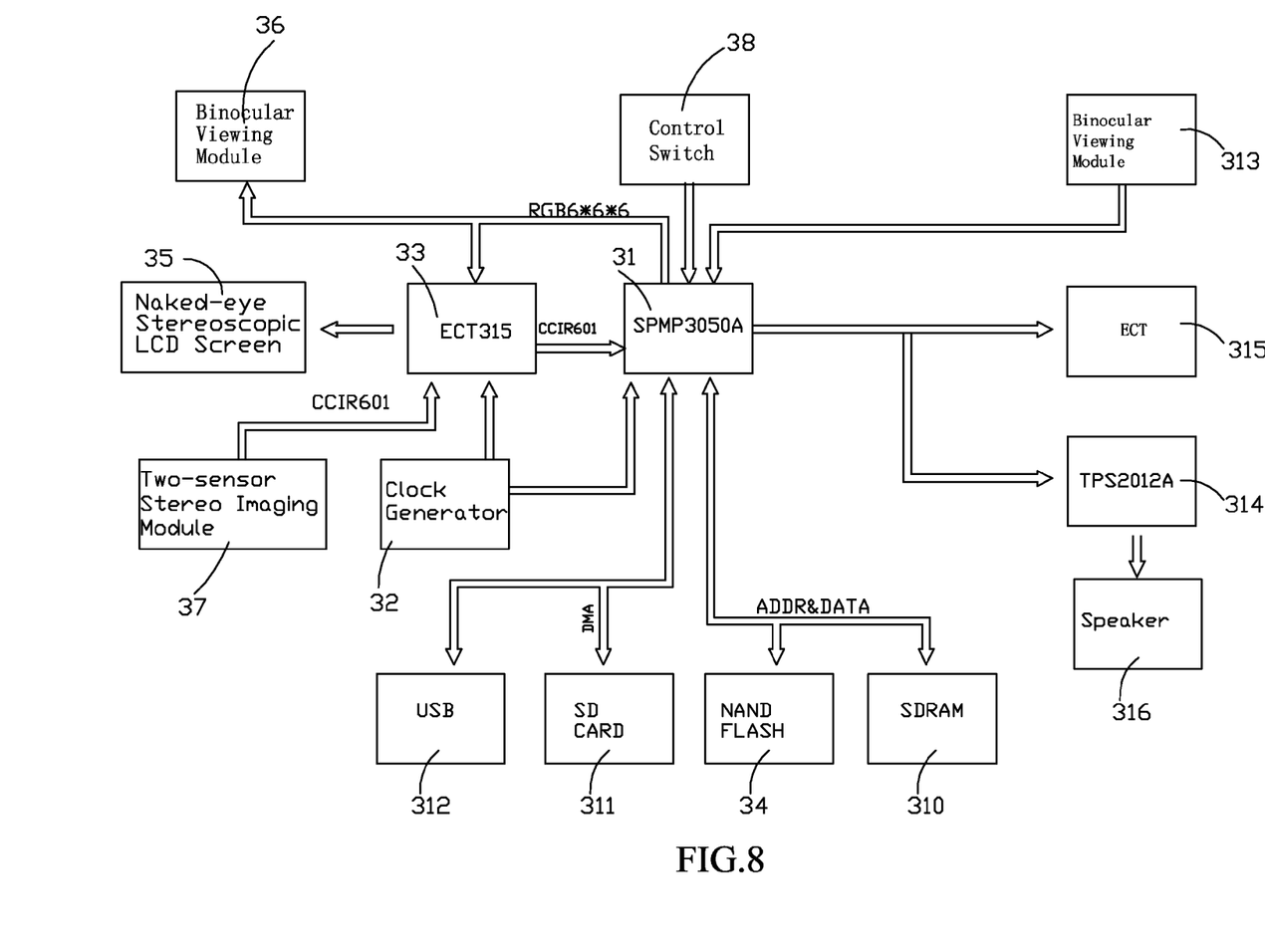
FIG. 8 is a schematic structural view of Embodiment 4 of the present invention.
Figure 9:
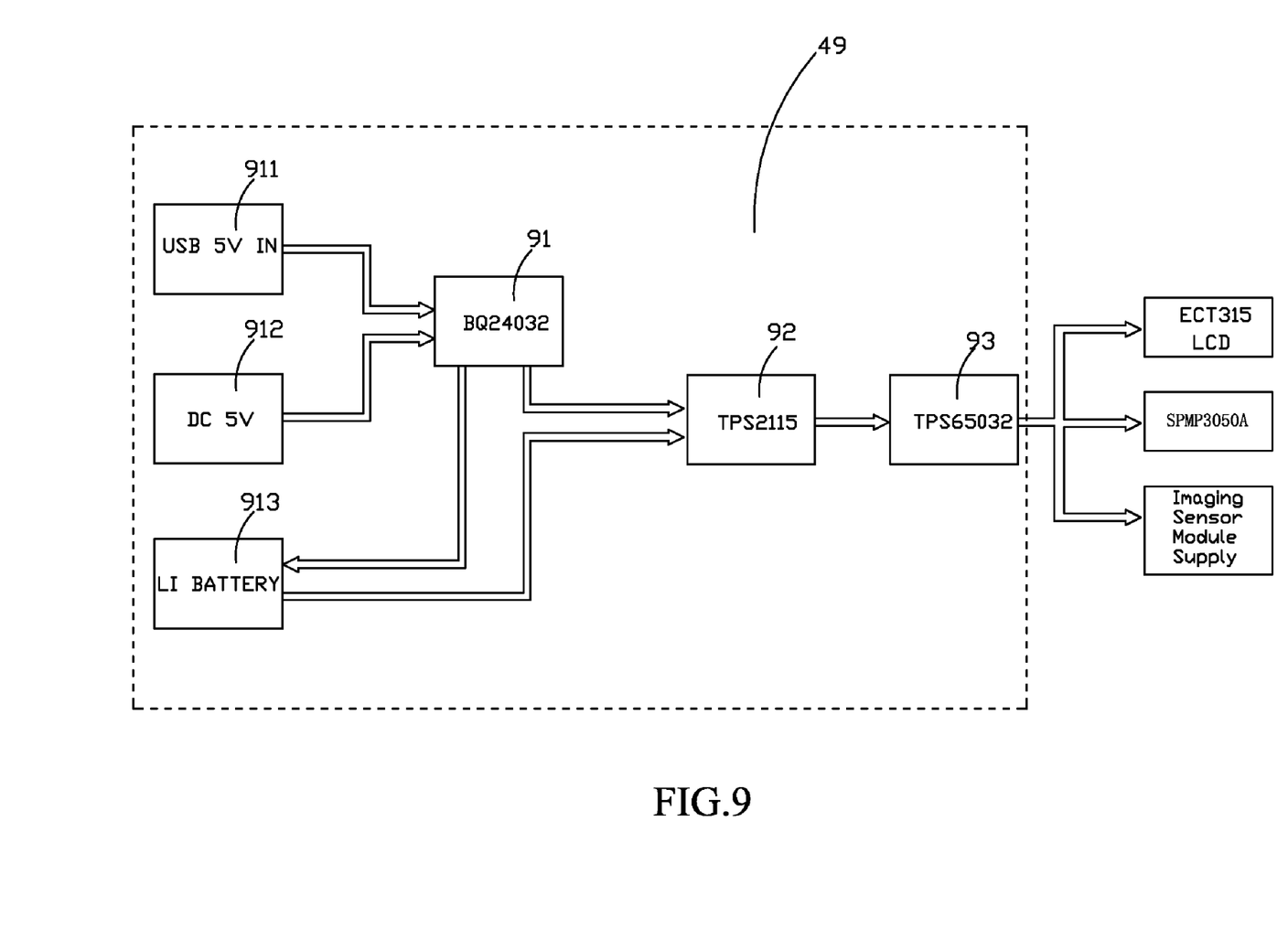
FIG. 9 is a schematic structural view of a power system according to Embodiment 4 of the present invention.

As shown in FIGS. 8 and 9, in order to realize another particular circuit structure with functions as described in Embodiment 1 and Embodiment 2, the stereo video shooting and viewing device in this embodiment includes a central processing unit (CPU) 41, a clock generator 42, an image processor 43, a memory 44, a naked-eye stereoscopic LCD screen 45, a binocular viewing module 46, two digital camera lenses 47, a control button 48, a power system 49, a buffer memory 410, a memory card slot 411, an input/output module (I/O module) 412, a microphone 413, an audio amplifying unit 414, a headphone jack 15, and a speaker 416. The power system 49 includes a power management and Li battery charging unit 91, a power adjusting unit 92, a power management unit 93, a USB power port 911, an external power port 912, and a Li battery 913. In this embodiment, the memory card slot 411 is an SD card expansion slot, and the I/O module 412 is a USB port. The binocular viewing module 313 particularly includes two groups of eyepieces 2 and two micro display screens 3, which have the same structures as that in Embodiment 1 or Embodiment 2. The MCU in the Embodiment 1 and Embodiment 2 is equivalent to functions including the CPU 41, the clock generator 42, and the image processor 43 in this embodiment.

The model of the CPU 41 in this embodiment may be SPMP3050A, which is integrated with the audio processing function and the USB&SD driving function. The model of the image processor 3 may be ECT 315, and other image processing ICs with similar functions, for example, ECT223, may be selected. The model of the power management and Li battery charging unit 91 may be BQ24032, the model of the power adjusting unit 92 may be TPS1115, and the model of the power management unit 93 may be TPS65032.

In this embodiment, the image shooting and playing principle is described as follows. The image processor 43 is electrically connected to output ends of the two digital camera lenses 47 through an image input end thereof, receives the two groups of synchronous image signals with the visual angle difference, and transmits the synchronous image signals after being filtered and synthesized to the CPU 41 through a CCIR601 interface. The CPU 41 compresses and stores the received CCIR601 signals according to a storage format. During playing, the CPU 41 decompresses and outputs the data in the memory through an image output end thereof in an RGB signal format. The CPU 41 further controls to select the binocular viewing module 46 to receive the data through an input end thereof and to display the data. Under such a display mode, the two groups of image signals with the visual angle difference are respectively displayed on the two micro LCD screens of the binocular viewing module 46, and a stereo image is produced when people view the two groups of display contents respectively through two eyes. Alternatively, the data may be received by the image input end of the image processor 43, and then output to the naked-eye stereoscopic LCD screen 45, in which the image processor 43 further drives the naked-eye stereoscopic LCD screen 45 to display images. The crystal clock generator 42 is electrically connected to the CPU 41 and the image processor 43 respectively, which provides the crystal oscillation of 27 MHz to the CPU 41, and provides the crystal oscillation of 20 MHz to the image processor 43, thereby facilitating the normal operation of the internal programs.

In this embodiment, the audio receiving and processing principles are described as follows. An output end of the microphone 413 is electrically connected to the CPU 41, for receiving the audio signals. An output end of the CPU 41 is electrically connected to the headphone jack 15 and an input end of the audio amplifying unit 414 respectively, for outputting the audio signals.

In this embodiment, the data storing and transmitting principles are described as follows. The CPU 41 is electrically connected to the memory 44, the buffer memory 410, the USB port 412, and the SD card expansion slot 411 respectively. The memory 44 is an NAND flash memory with a nonvolatile technique, which has the maximum capacity of up to 4 G. The buffer memory 410 provides a capacity of 16 MB*2, so as to improve the processing speed of the CPU 41. The CPU 41 receives and processes the image signals and the audio signal, and then transmits the processed image signals and audio signal to the memory 44 through an ADDR&DATA bus for storage. The USB port 412 is used for data transmission, for example, to receive data from the exterior or to output data to the exterior. The SD card expansion slot 411 supports the access of the SD card with the maximum capacity of 4G, for expanding the storage capability of the memory, which is convenient for data transmission.

In this embodiment, the operation principles of the power source and the control system are described as follows.

The power management and Li battery charging unit 91 is electrically connected to the power adjusting unit 92, the USB power port 911, the external power port 912, and the Li battery 913 respectively. The power adjusting unit 92 is electrically connected to the Li battery 913 and the power management unit 93 respectively. The power management and Li battery charging unit 91 manages the power input from the USB power port 911 and the external power port 912, or charges the Li battery by using the externally-input power, when the Li battery 913 runs out of power. The power adjusting unit may select an externally-connected DC power or the battery power to provide power to the device. The power management unit 93 is electrically connected to the CPU 41, the image processor 43, the naked-eye stereoscopic LCD screen 45, the binocular viewing module 46, and the two digital camera lenses 47 respectively. The power management unit 93 converts and bucks the received power and provides the power to each module, and particularly, the power management unit 93 respectively provides a DC power of 1.8 V to the CPU 41, provides a power of 1.35V to the two digital camera lenses 47, provides a power of 2.8V to the image processor 43, the naked-eye stereoscopic LCD screen 45, and the LCD display screens in the binocular viewing module 46, and provides a power of 3.0 V to each I/O interface.

The control switch 48 is electrically connected to the CPU 41, for controlling to play signals, shooting stereo images, and selecting the playing devices, etc.

In the technical solution of this embodiment, through being displayed by the binocular viewing module, a vivid stereoscopic imaging effect is achieved, and the resolution of each of the two micro display screens falls between QVGA and VGA, which may approximately reach half of the resolution of the VGA.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stereo video shooting and viewing device, comprising:
   a body, having two groups of eyepieces disposed therein, wherein the two groups of eyepieces are spaced apart from each other by a certain distance corresponding to a distance between two human eyes;
   two micro display screens, disposed on front ends of the two groups of eyepieces respectively;
   two digital camera lenses, disposed on an outer side of the body, and spaced part from each other for a certain distance corresponding to the distance between two human eyes, for synchronously capturing images with a visual angle difference corresponding to that of the human eyes;
   a main control unit (MCU), connected to the two micro display screens and the two digital camera lenses, for processing the images synchronously captured by the two digital camera lenses, and separately displaying the images on the two micro display screens; and
   a naked-eye stereoscopic liquid crystal display (LCD) screen, located on the body, and connected to the MCU, wherein the images displayed on the two micro display screens are simultaneously displayed on the naked-eye stereoscopic liquid crystal display (LCD) screen.

2. The stereo video shooting and viewing device according to claim 1, further comprising:
   a memory, connected to the MCU, for storing an image data generated upon being processed by the MCU; and
   a memory card slot, located on the body, and connected to the MCU.

3. The stereo video shooting and viewing device according to claim 2, further comprising:
   an input/output module (I/O module), connected to the MCU, for exchanging data with exterior.

4. The stereo video shooting and viewing device according to claim 3, further comprising:
   a battery power, for supplying a power to the micro display screens, the digital camera lenses, the MCU, the memory, and the I/O module.

5. The stereo video shooting and viewing device according to claim 4, wherein:
   the body further has an external power port for being connected to the battery power.

6. The stereo video shooting and viewing device according to claim 1, wherein:
   the body further has two pick-ups and two speakers, and the pick-ups and the speakers are connected to the MCU.

7. The stereo video shooting and viewing device according to claim 1, wherein:
   the body further has a stereoscopic mobile television (TV) signal receiving unit for synchronously receiving audio signals and two groups of video signals, wherein the signal receiving unit is electrically connected to the MCU, and the MCU processes the audio signals and transfers the processed audio signals to the speakers, and processes the two groups of video signals and displays the processed video signals on the two micro display screens separately.

8. The stereo video shooting and viewing device according to claim 1, wherein:
   the body further has a display screen for view-finding during shooting, and the display screen is connected to the MCU.

9. The stereo video shooting and viewing device according to claim 1, wherein:
   the eyepieces are a lens assembly, a transflective mirror assembly, or a reflecting mirror assembly.

10. A stereo video shooting and viewing device, comprising:
    a body, having two groups of eyepieces disposed therein, wherein the two groups of eyepieces are spaced apart from each other by a certain distance corresponding to a distance between two human eyes;
    two micro display screens, disposed on front ends of the two groups of eyepieces respectively;
    two digital camera lenses, disposed on an outer side of the body, spaced apart from each other by a certain distance corresponding to the distance between two human eyes, for synchronously capturing images with a visual angle difference corresponding to that of the human eyes;
    a main control unit (MCU), connected to the two micro display screens and the two digital camera lenses, for processing the images synchronously captured by the two digital camera lenses, and displaying the images on the two micro display screens separately;
    a memory, connected to the MCU, for storing an image data generated upon being processed by the MCU;
    an input/output module (I/O module), connected to the MCU for exchanging data with exterior; and
    a battery power, for supplying a power to the micro display screens, the digital camera lenses, the MCU, the memory, and the I/O module;
    wherein the body further has two pick-ups and two speakers, and the two pick-ups and the two speakers are connected to the MCU;
    the body further has a memory card slot connected to the MCU; and
    a naked-eye stereoscopic liquid crystal display (LCD) screen, located on the body, and connected to the MCU, wherein the images displayed on the two micro display screens are simultaneously displayed on the naked-eye stereoscopic liquid crystal display (LCD) screen.

11. A stereo video shooting and viewing device, comprising:
    a body, having a binocular viewing module disposed thereon, wherein the binocular viewing module comprises two groups of eyepieces and two micro display screens, the two groups of eyepieces are disposed on one side surface of the body and spaced apart from each other by a certain distance corresponding to a distance between two human eyes, and the two micro display screens are disposed on front ends of the two groups of eyepieces respectively;
    a two-sensor stereo imaging module, having two digital camera lenses, wherein the two digital camera lenses are disposed on the other side surface of the body, spaced apart from each other by a certain distance corresponding to the distance between two human eyes, and used for synchronously capturing images with a visual angle difference corresponding to that of the human eyes;
a naked-eye stereoscopic LCD screen, located on the body; and
a main control unit (MCU), connected to the naked-eye stereoscopic LCD screen, the two micro display screens, and the two digital camera lenses respectively, for processing images synchronously captured by the two-sensor stereo imaging module, displaying the images on the two micro display screens separately and simultaneously displaying the images directly on the naked-eye stereoscopic LCD screen.

12. The stereo video shooting and viewing device according to claim 11, further comprising:
a memory, connected to the MCU, for storing an image data generated upon being processed by the MCU;
an input/output module (I/O module), connected to the MCU, for exchanging data with exterior; and
a battery power, for supplying a power to the micro display screens, the digital camera lens, the MCU, the memory, and the I/O module.

13. The stereo video shooting and viewing device according to claim 12, wherein:
the body further has an external power port, a memory card slot, and control buttons, the external power port is connected to the battery power, and the memory card slot and the control buttons are respectively connected to the MCU.

14. The stereo video shooting and viewing device according to claim 13, wherein:
the body further has two pick-ups and two speakers, and the two pick-ups and the two speakers are connected to the MCU respectively.

15. The stereo video shooting and viewing device according to claim 14, wherein:
the body further has a stereo signal receiving unit for synchronously receiving audio signals and two groups of video signals, the stereo signal receiving unit is connected to the MCU, and the MCU processes the audio signals and transfers the processed audio signals to the speakers, and processes the two groups of video signals and displays the processed video signals on the two micro display screens separately and/or directly displays the processed video signals on the naked-eye stereoscopic LCD screen.

16. The stereo video shooting and viewing device according to claim 15, wherein:
one side of the naked-eye stereoscopic LCD screen is hinged to the body through a swivel base, and the naked-eye stereoscopic LCD screen is movably connected to the swivel base.

17. The stereo video shooting and viewing device according to claim 11, wherein:
the two digital camera lenses and the body are movably connected together in a manner of being inclined inwards, and an inward-inclined angle thereof is adjusted through an adjusting nut.

18. The stereo video shooting and viewing device according to claim 11, wherein:
the MCU comprises a central processing unit (CPU), an image processor, and a clock generator;
wherein the image processor receives and processes two groups of synchronous signals with a visual angle difference output by the two-sensor stereo imaging module, and then outputs the processed synchronous signals to the CPU, and the image processor further drives the naked-eye stereoscopic LCD screen;
the CPU receives and processes image signals output by the image processor, and then outputs the processed image signals to the two micro display screens of the binocular viewing module; and
the clock generator is electrically connected to the CPU and the image processor respectively, for providing crystal oscillation to both the CPU and the image processor.

19. The stereo video shooting and viewing device according to claim 18, further comprising:
a memory, a buffer memory, and a memory card slot, electrically connected to the CPU respectively.

20. The stereo video shooting and viewing device according to claim 19, further comprising:
a microphone, an audio amplifying unit, and a speaker, electrically connected to the CPU respectively, wherein an output end of the audio amplifying unit is electrically connected to an input end of the speaker.

21. The stereo video shooting and viewing device according to claim 18, further comprising:
a headphone jack, electrically connected to the CPU; and
a universal serial bus (USB) port, electrically connected to the CPU.

22. The stereo video shooting and viewing device according to claim 21, further comprising:
a power management and Li battery charging unit, a power adjusting unit, a power management unit, a USB power port, an external power port, and a Li battery, wherein the power management and Li battery charging unit is electrically connected to the power adjusting unit, the USB power port, the external power port, and the Li battery respectively; the power adjusting unit is electrically connected to the Li battery and the power management unit respectively; and the power management unit is electrically connected to the CPU, the image processor, the naked-eye stereoscopic LCD screen, the binocular viewing module, and the two-sensor stereo imaging module respectively.

23. A stereo video shooting and viewing device, comprising:
a body, having a binocular viewing module disposed thereon, wherein the binocular viewing module comprises two groups of eyepieces and two micro display screens, the two groups of eyepieces are disposed on one side surface of the body and spaced apart from each other by a certain distance corresponding to a distance between two human eyes, and the two micro display screens are respectively disposed on front ends of the two groups of eyepieces;
a two-sensor stereo imaging module, having two digital camera lenses, wherein the two digital camera lenses are disposed on the other side surface of the body, spaced apart from each other by a certain distance corresponding to the distance between two human eyes, and used for synchronously capturing images with a visual angle difference corresponding to that of the human eyes;
a central processing unit (CPU), a clock generator, an image processor, an audio processor, a naked-eye stereoscopic LCD screen, a control switch, a power system, an internal memory, and a microphone;
wherein the image processor, the audio processor, the binocular viewing module, the internal memory, and the control switch are electrically connected to the CPU respectively; an image output end of the two-sensor stereo imaging module is connected to the image processor, and the image processor is further electrically connected to the naked-eye stereoscopic LCD screen;

the clock generator is electrically connected to the CPU and the image processor respectively; an audio output end of the microphone is electrically connected to the audio processor, and the audio processor is further electrically connected to an audio amplifier, the audio amplifier is electrically connected to a speaker; and the power system is electrically connected to the CPU, the image processor, the audio processor, the naked-eye stereoscopic LCD screen, and the two-sensor stereo imaging module respectively, wherein images separately displayed on the two micro display screens are simultaneously displayed on the naked-eve stereoscopic LCD screen.

24. The stereo video shooting and viewing device according to claim 23, further comprising:

a swivel base, wherein one side of the naked-eye stereoscopic LCD screen is hinged to the body through the swivel base, and the naked-eye stereoscopic LCD screen is movably connected to the swivel base.

25. The stereo video shooting and viewing device according to claim 24, further comprising:

a buffer memory, a secure digital (SD) card expansion slot, a USB port , and an SD&USB drive, wherein the CPU is further electrically connected to the SD&USB drive and the buffer memory, and the SD&USB drive is electrically connected to the power system, the clock generator, the USB port, and the SD card expansion slot respectively.

26. The stereo video shooting and viewing device according to claim 25, wherein:

the power system comprises a power management and Li battery charging unit, a power adjusting unit, a power management unit, a USB power port, an external power port, and a Li battery, wherein the power management and Li battery charging unit is electrically connected to the power adjusting unit, the USB power port, the external power port, and the Li battery respectively; the power adjusting unit is electrically connected to the Li battery and the power management unit respectively; and the power management unit is electrically connected to the CPU, the SD&USB drive, the image processor, the audio processor, the naked-eye stereoscopic LCD screen, the binocular viewing module, and the two-sensor stereo imaging module respectively.

27. The stereo video shooting and viewing device according to claim 26, further comprising:

a headphone jack, electrically connected to the CPU.

* * * * *